United States Patent [19]

Knudson

[11] 4,156,337

[45] May 29, 1979

[54] PIVOTALLY MOUNTED GRASS CATCHER FOR RIDING MOWER

[75] Inventor: Henry T. Knudson, Grafton, Wis.

[73] Assignee: Allis-Chalmers Corporation, Milwaukee, Wis.

[21] Appl. No.: 885,961

[22] Filed: Mar. 13, 1978

[51] Int. Cl.² ................... A01D 35/22; A01D 53/06
[52] U.S. Cl. ........................................ 56/202; 56/16.6
[58] Field of Search ............... 56/16.6, 202, 203, 204, 56/205, 206

[56] References Cited

U.S. PATENT DOCUMENTS

| 2,947,571 | 8/1960  | Hagen ........................... 56/16.6 |
| 3,541,770 | 11/1970 | Dufour .......................... 56/202  |
| 3,736,736 | 6/1973  | Myers ........................... 56/202  |
| 3,934,392 | 1/1976  | Moery et al. .................... 56/202  |
| 3,971,198 | 7/1976  | Lane ............................ 56/202  |
| 4,015,406 | 4/1977  | Witt et al. ..................... 56/202  |
| 4,047,368 | 9/1977  | Peterson ........................ 56/202  |
| 4,095,398 | 6/1978  | Asmann et al. ................... 56/202  |

FOREIGN PATENT DOCUMENTS 1250955  10/1971  United Kingdom ................ 56/203

Primary Examiner—Louis G. Mancene
Assistant Examiner—Paul J. Hirsch
Attorney, Agent, or Firm—Robert C. Sullivan

[57] ABSTRACT

A grass catcher for a riding mower, comprising a stationary subassembly adapted to be secured to the rear of the ride-on vehicle and a bag support frame mounted for pivotal movement on the stationary subassembly. A grass collector bag is carried by the bag support frame, and a cover member is hingedly connected to one side of the bag support frame. The pivotal connection between the bag support frame and the stationary subassembly on which it is pivotally mounted is of hollow ring-like shape whereby to permit the end of the stationary grass delivery tube to extend through the ring-like pivotal connection and into overlying discharging position relative to the grass collector bag carried by the pivotally mounted bag support frame. A handle mounted on the bag support frame permits the operator to pivotally swing the bag support frame and the grass collector bag carried thereby to dumping position about the pivotal support for the frame, the bag support frame also at the same time pivoting about the stationary grass delivery tube. During the dumping operation the cover member which is normally seated in closed position on the bag support frame swings open about a hinge connection of the cover to the bag support frame, whereby to permit the contents of the grass collector bag to discharge during the dumping operation. When the pivotally mounted bag support frame is returned to normal grass collecting position, the cover member returns to closed seated position on the bag support frame.

14 Claims, 5 Drawing Figures

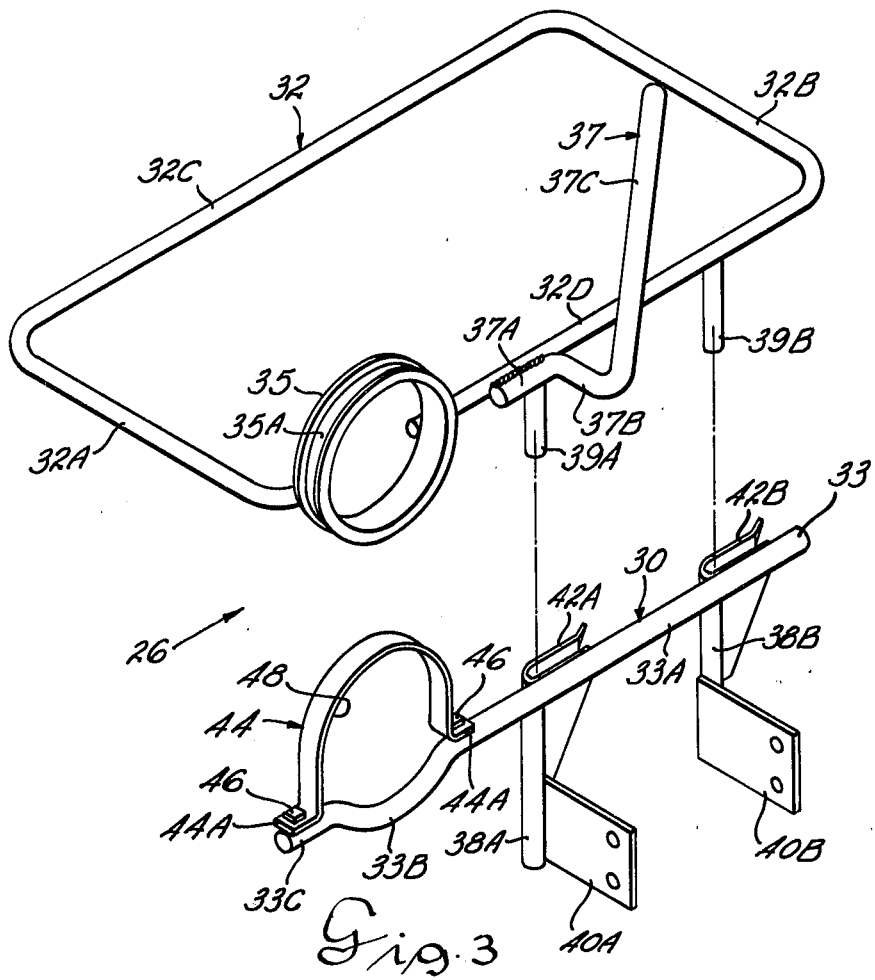
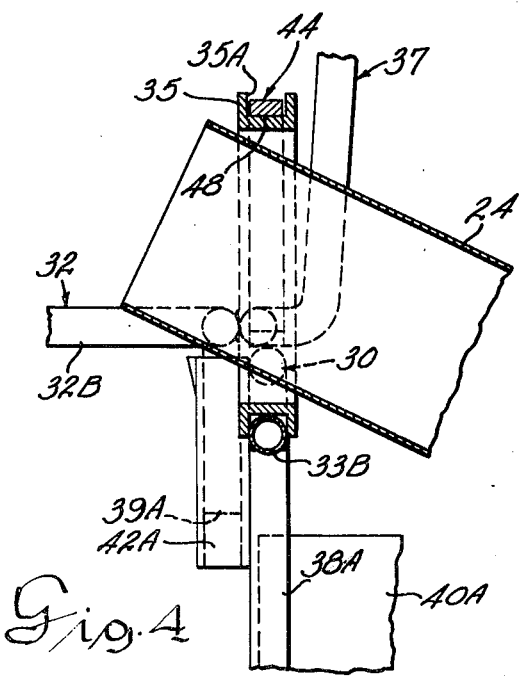
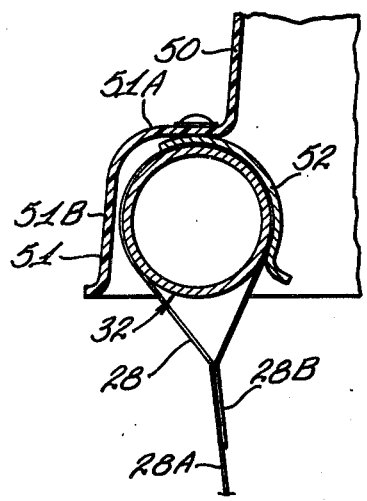

PIVOTALLY MOUNTED GRASS CATCHER FOR RIDING MOWER

BACKGROUND OF THE INVENTION

Field of the Invention

This invention relates to riding type Lawn mowers and to a grass catcher therefor, and more particularly to a mounting arrangement for a grass catcher on a riding type Lawn mower which permits the grass catcher to be manually operated to dumping position by the operator while he is still seated on the vehicle and while the vehicle engine is running, and without removing the grass delivery tube from the grass collector receptacle or bag.

In most of the grass collecting arrangements for riding type Lawn mowers, when the grass collector bag or container becomes filled with grass, the operator stops the vehicle, dismounts, and unloads the grass collector bag. The unloading operation of the prior art generally involved removing the bag cover, removing the grass delivery tube from the grass collector bag, sliding the filled bag out of or lifting the filled bag off of the bag supporting frame, inverting the bag to empty its contents, replacing the empty grass bag on the supporting frame, and again placing the grass delivery tube in discharging position with respect to the grass collector bag. The operator then remounted the ride-on vehicle to continue the grass cutting and grass collecting operation. This prior art arrangement just described had several disadvantages including (1) the operator must stop and leave the operator's seat to unload the grass collector bag; (2) the unloading operation can be unsafe if the vehicle engine is not shut off when the operator dismounts to unload the grass collector bag; (3) the succulent green grass is heavy and can be difficult to handle when unloading; and (4) the disadvantage of having to move the grass delivery tube out of discharge relation to the grass collector bag in order to dump the contents of the bag, and then having to return the grass delivery tube into discharge relation to the collector bag when resuming the grass collecting operation.

Another additional type of prior art grass collecting arrangement for Lawn mowers permits the grass clippings to be dumped slightly above ground level, and has the disadvantage that it does not permit unloading on top of a previous dump or into a wagon or cart.

As a further example of the prior art, reference is made to U.S. Pat. No. 3,541,770 granted to Jean-Rene Dufour on Nov. 24, 1970. The patent just mentioned shows a walk-behind lawn mower which is provided with a manually operated side dumping grass collector or container.

STATEMENT OF THE INVENTION

Accordingly, it is an object of the present invention to provide a mounting arrangement for a grass catcher or collector for use with lawn mowers of the ride-on type in which the operator of the lawn mower does not have to leave the operator's seat to unload the grass collector bag.

It is a further object of the invention to provide a mounting arrangement for a grass catcher or grass collector bag for use with riding type lawn mowers in which the operator can safely leave the mower engine running but with the mower blades disengaged during the dumping operation for the grass catcher, since the operator continues to remain in the operator's seat during the grass dumping operation.

Still a further object of the invention is to provide a mounting arrangement for a grass catcher or grass collector bag which is particularly useful for use with riding type lawn mowers, and in which the grass collector bag or container may be dumped by the operator with considerably less effort than has been required in the dumping arrangements of the prior art.

Still a further object of the invention is to provide a mounting arrangement for a grass collector bag for use with a riding mower in which the grass collector bag is adapted to unload on top of a previous dump or to unload into a contiguous wagon or cart.

Still a further object of the invention is to provide a mounting arrangement for a grass catcher or collector for use with riding type lawn mowers in which the grass collector bag may be dumped while the grass delivery tube which delivers grass clippings to the collector bag is mounted in its normal operating position, and without the necessity of removing the grass delivery tube from the collector bag or container preparatory to the dumping operation.

In achievement of these objectives, there is provided in accordance with an embodiment of the invention a grass catcher for a riding mower comprising a stationary subassembly adapted to be secured to the rear of the ride-on vehicle and a bag support frame mounted for pivotal movement on the stationary subassembly. A grass collector bag is carried by the bag support frame, and a cover member is hingedly connected to one side of the bag support frame. The pivotal connection between the bag support frame and the stationary subassembly on which it is pivotally mounted is of hollow ring-like shape whereby to permit the end of the stationary grass delivery tube to extend through the ring-like pivotal connection and into overlying discharging position relative to the grass collector bag carried by the pivotally mounted bag support frame. A handle mounted on the bag support frame permits the operator to pivotally swing the bag support frame and the grass collector bag carried thereby to dumping position about the pivotal support for the frame, the bag support frame also at the same time pivoting about the stationary grass delivery tube. During the dumping operation the cover member which is normally seated in closed position on the bag support frame swings open about a hing connection of the cover to the bag support frame, whereby to permit the contents of the grass collector bag to discharge during the dumping operation. When the pivotally mounted bag support frame is returned to normal grass collecting position, the cover member returns to closed seated position on the bag support frame.

BRIEF DESCRIPTION OF THE DRAWINGS

Further objects and advantages of the invention will become apparent from the following description taken in conjunction with the accompanying drawings in which:

FIG. 3 is a perspective exploded view of the pivotally movable support frame for the grass collector bag and also of the stationary support structure on which the pivotally movable bag support frame is mounted;

FIG. 4 is a view in vertical section taken along lines IV—IV of FIG. 2; and

FIG. 5 is a view in vertical section taken along line V—V of FIG. 1

DESCRIPTION OF THE PREFERRED EMBODIMENT

Figure 1:
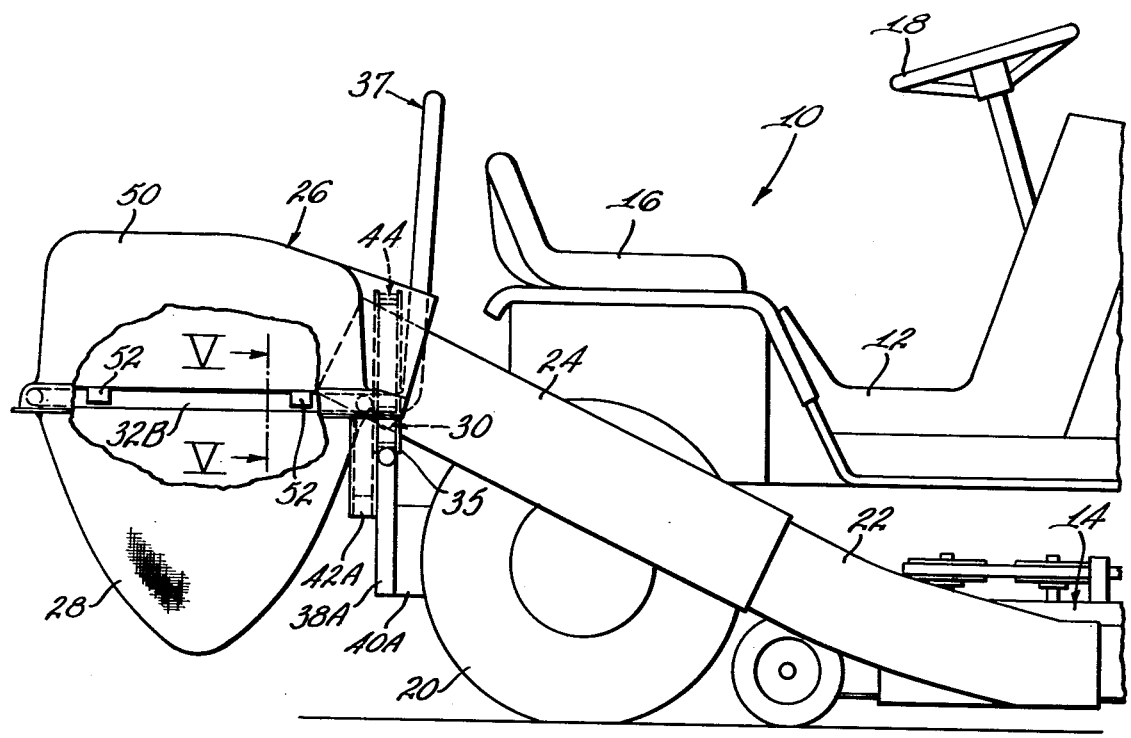
FIG. 1 is a side elevation view of a riding type lawn mower having a grass dumping arrangement in accordance with the present invention.
Figure 2:
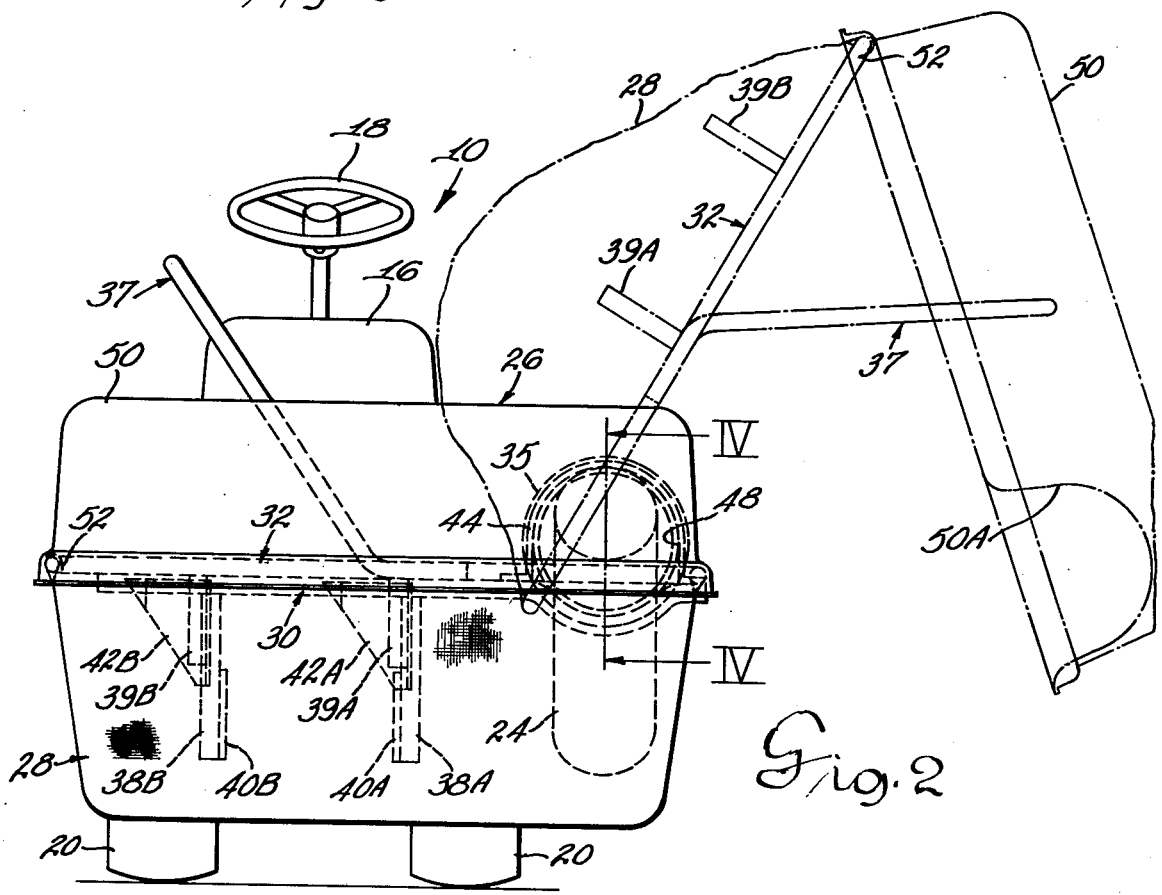
FIG. 2 is a rear view of the riding lawn mower of FIG. 1 with the grass catcher being shown in normal operating position in full line and in the dumping position in phantom line.

Referring now to the drawings, there is shown a riding type lawn mower generally indicated at 10 including a self-propelled vehicle 12 having a rotary grass mower generally indicated at 14 suitably mounted beneath the chassis of the vehicle. The views of vehicle 12 in FIGS. 1 and 2 show an operator's seat 16, a steering wheel 18 and rear wheels 20. The cutting elements of rotary mower 14 are suitably driven from the gasoline engine or other prime mover of vehicle 12 through a control clutch in a manner well known in the art. Rotary mower 14 includes a grass discharge chute or tube 22 which is connected at its outer end to a grass delivery tube 24 which extends rearwardly and into the interior of a grass collector device or assembly generally indicated at 26 whereby the grass clippings discharged from the outlet end of grass delivery tube 24 pass into the interior of a grass collector bag 28 which forms part of grass collector assembly 26.

As best seen in the view of FIG. 3, grass collector assembly 26 includes a stationary subassembly generally indicated at 30 which is secured to the rear of riding vehicle 12, and a pivotally movable subassembly generally indicated at 32 which is pivotally mounted on stationary subassembly 30. The subassembly 32 is pivotally movable relative to the stationary subassembly 30 when grass collector bag 28 is moved to dumping position, as best seen in the phantom view of FIG. 2.

The stationary subassembly 30 includes a tubular member 33 which extends laterally of the longitudinal axis of the riding vehicle when mounted on the rear of the riding vehicle. Tubular member 33 includes a straight portion indicated at 33A which extends for the greater portion of the length of member 33. Two straight tubular members respectively indicated 38A and 38B extend downwardly in laterally spaced relation to each other from the undersurface of laterally extending tubular member 33. Downwardly extending members 38A and 38B lie in the same vertical plane as laterally extending tubular member 33 to which they are attached, with the upper ends of the members 38A and 38B being welded to the undersurface of tubular member 33. A pair of support bracket members respectively indicated at 40A and 40B are respectively welded to the lower portions of the respective downwardly extending members 38A and 38B, bracket members 40A and 40B extending in a longitudinal direction with respect to the longitudinal axis of riding vehicle 12 and being suitably bolted or otherwise secured to the rear portion of the structure of riding vehicle 12.

Stationary subassembly 30 also includes upwardly open pocket-like members of U-shaped cross section respectively indicated at 42A and 42B in FIG. 3 which are adapted to receive downwardly depending tube sections 39A and 39B carried by the pivotally movable bag supporting subassembly 32, as will be described hereinafter, when pivotally movable subassembly 32 is in the bag-filling position shown in FIG. 1 and in full line in FIG. 2. Pocket-like members 42A and 42B are suitably secured in position as by welding and are in abutting relation to the rearwardly facing surfaces of tubular portion 33A and of downwardly depending tubular members 38A, 38B.

Laterally extending tubular member 33 of the stationary subassembly 30 is formed at the left-hand portion thereof relative to the view shown in FIG. 3 with an arcuate portion indicated at 33B, which emerges at the left-hand end thereof relative to the view of FIG. 3 with a straight horizontal portion 33C which lies in the same horizontal plane as and in alignment with the straight portion 33A of tubular member 33. A band member 44 of arcuate shape and terminating in a pair of horizontal flat portions each indicated at 44A is adapted to be detachably secured by suitable fastening members 46 to straight portions 33A and 33C of tubular member 33 and in overlying relation to arcuate portion 33B of tubular member 33, whereby the arcuate band member 44 and the arcuate portion 33B of tubular member 33 together define a substantially circular aperture indicated at 48.

The pivotally movable bag supporting subassembly 32 includes a tubular metal frame member of generally rectangular shape including a pair of oppositely disposed parallel sides 32A and 32B which extend in a lengthwise direction relative to the longitudinal axis of riding mower 10, and a pair of oppositely disposed parallel sides 32C and 32D which extend in a direction laterally of the longitudinal axis of the riding mower.

Side 32D of bag frame 32 is interrupted contiguous the left-hand end thereof relative to the view of FIG. 3, and a hollow ring-shaped pivot member 35 is secured as by welding to the forward surface of bag frame side 32D in the region of the interrupted portion of side 32D of the bag frame. As best seen in the view of FIG. 4, the outer periphery of ring-shaped pivot member 35 is of channel cross section as indicated at 35A. It can be seen that with stationary subassembly 30 secured by means of brackets 40A, 40B to the rear end stationary structure of riding vehicle 12, and with detachable arcuate band member 44 detached from tubular member 33 of stationary support structure 30, that the pivotally movable bag supporting subassembly 32 may be assembled relative to stationary subassembly 30 by engaging the channel-shaped outer periphery 35A of pivot ring 35 of bag frame 32 with the arcuate portion 33B of tubular member 33. After pivot ring 35 has been seated on arcuate portion 33B of stationary subassembly 30, the arcuate band portion 44 may then be positioned above and in circumferentially embracing relation to the channel-shaped outer periphery 35A of pivot ring 35, with the opposite flat horizontal ends 44A of band member 44 then being detachably secured by fastening means 46 to tubular member 33. Arcuate portion 33B and the arcuate portion of band 44 together define a bearing which journals pivot ring 35 and the bag support frame 32 of which it forms a part for angular pivotal movement relative to stationary subassembly 30. The channel-shaped outer periphery 35A of pivot ring 35 maintains the pivot ring in proper tracking registry with stationary bearing members 33B–44 at all times.

Pivotally movable bag support subassembly 32 is provided with a handle member generally indicated at 37 including a lower portion 37A which extends parallel to and is welded to the forward surface of side 32D of bag support frame 32. Handle 37 also includes a relatively short longitudinally extending portion 37B which extends from the right-hand end (relative to FIG. 3) of handle portion 37A to the lower end of the upright operating portion 37C of the handle.

A pair of laterally spaced normally vertical tubular portions 39A and 39B are connected as by welding to the under surface of side 32D of pivotally movable bag support frame 32 and extend downwardly from side 32D.

As best seen in the views of FIGS. 1, 2 and 4, when the pivotally movable bag support subassembly 32 is assembled relative to stationary subassembly 30 and with pivot ring 35 journaled within the bearing defined by the arcuate portions 33B and 44 of stationary subassembly 30, the end of grass delivery tube 24 extends upwardly at an inclination and passes through the opening defined by circular pivot ring 35 and into the interior of the grass collector assembly 26 where tube 24 can discharge grass clippings, leaves, or the like into the interior of grass collector assembly 26 and thus into grass collector bag 28.

Grass collector bag 28 is normally made of a fabric-like material and has the upper end thereof lapped around the four sides of tubular support frame 26, with the overlapped edge 28B of the bag being suitably secured to main portion 28A of the bag as best seen in FIG. 5, so that the grass collector bag is suspended from all four sides 32-A-B-C-D of the bag support frame. A cover member generally indicated at 50 made of a suitable material, such as a molded plastic, is mounted on bag support frame 26 as best seen in the views of FIGS. 1, 2 and 5. Cover member 50 is provided around most of its periphery with an overhanging lip 51 which is adapted to seat on bag frame 32 when the bag frame and bag 28 are in filling position. Lip 51 includes a normally substantially horizontal portion 51A and a normally downwardly depending portion 51B. A pair of longitudinally spaced metal spring clip members each indicated at 52, are riveted or otherwise suitably secured to the undersurface of the normally horizontal portion 51A of cover lip 51 which overlies longitudinal side 32B of bag support frame 32. Spring clip members 52 define hinge members about which cover 50 can pivotally swing to an open position relative to bag support frame 32 when grass catcher 26 is moved to the dumping position shown in phantom line in the view of FIG. 2. The portion of cover 50 which overlies the region of the pivotal connection is suitably contoured as indicated at 50A to accommodate the cover to the contour of the pivot members.

During the filling operation cover member 50 is seated on bag support frame 32 in covering relation to grass collector bag 28 as seen in the view of FIG. 1 and in the full line view of FIG. 2. However, if it is desired to dump the collected grass or leaves from grass collector bag 28, the operator of the riding mower grasps operating handle 37 and swings pivotally mounted bag support frame 32 about the pivotal connection defined by pivot ring 35 with respect to the stationary bearing defined by members 33B and 44, so that bag support frame 32 and bag 28 supported by frame 32 move to the dumping position shown in phantom line in the view of FIG. 2. In moving from the bag filling position to the bag dumping position as just described, bag support frame 32 also moves pivotally about grass delivery tube 24. When the pivotally mounted grass collector assembly 26 moves to the dumping position shown in FIG. 2, cover member 50 swings open about the hinge connection defined by clip members 52 as shown in phantom line in FIG. 2, and the contents of collector bag 28, such as grass, leaves or the like, are dumped to the side of the riding mower. The operator can perform the dumping operation just described by means of the manually operated handle 37 without leaving the operator's seat. Furthermore, since the operator is still seated on the vehicle and thus is in control of the vehicle, the operator can dump the grass as just described with the engine of the riding mower still in operation, but with the mower blade disengaged from the engine.

A further advantage of the construction hereinbefore described is that the mounting arrangement of grass collector assembly 26 for pivotal swinging movement about grass delivery tube permits the grass unloading operation to take place without removal of grass delivery tube 24 from the grass collector bag or receptacle 28 prior to the unloading operation.

After the contents of grass collector bag 28 have been emptied during the dumping operation, the operator then swings handle 37 in the reverse direction to that employed when dumping was desired, thereby causing bag frame 32 to pivotally move back to the full line position shown in FIG. 2. When bag frame 32 returns to the loading position, the force of gravity causes cover member 50 to swing about its hinges 52 to return to the position shown in FIG. 1 and in full line in FIG. 2 in which cover 50 is again seated in closed position on bag support frame 32.

Also, when pivotally movable bag support frame 32 is returned to the bag filling position shown in FIG. 1 the two tube sections 39A, 39B carried by bag support frame 32 will seat in the upwardly open pockets 42A, 42B carried by stationary subassembly 30, to thereby remove some of the load from pivot ring 35 and to help stabilize bag support frame 32.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A grass catcher assembly for use with a riding type lawn mower of the type in which the grass clippings discharged by the mower pass through a grass delivery tube into a grass-receiving receptacle, said grass catcher assembly comprising a stationary bearing means adapted to be mounted on the riding mower for supporting for pivotal movement a pivotally movable subassembly, said pivotally movable subassembly including a receptacle support means and a grass-receiving receptacle carried by said receptacle support means, said pivotally movable subassembly further including a journal member supported for pivotal movement by said stationary bearing means whereby to mount said pivotally movable subassembly for pivotal movement, said journal member having an aperture therein through which said grass delivery tube can extend into a position in which it can discharge grass clippings or the like into said receptacle, said pivotally movable subassembly being pivotally movable about said bearing means and also being pivotally movable about said grass delivery tube from a filling position to a dumping position in which the grass clippings or the like contained in said receptacle are dumped.

2. A grass catcher assembly as defined in claim 1 including means adapted to be stationarily mounted on said riding mower and adapted to engage said pivotally movable subassembly to support said subassembly in the filling position of said subassembly.

3. A grass catcher assembly as defined in claim 1 in which said receptacle is a flexible bag.

4. A grass catcher assembly as defined in claim 1 comprising a stationary subassembly adapted to be mounted on the riding mower, and in which said stationary subassembly includes said stationary bearing means which supports for pivotal movement said pivotally movable subassembly.

5. A grass catcher assembly as defined in claim 1 in which said pivotally movable subassembly includes a support frame on which said receptacle is supported, and in which a pivot ring is carried by and movable with said support frame, said pivot ring being journaled in said stationary bearing means, said pivot ring and said stationary bearing means having aligned apertures through which said grass delivery tube can extend into a position in which it can discharge grass clippings or the like into said receptacle.

6. A grass catcher assembly as defined in claim 1 including a cover member for said receptacle, said cover member being hingedly mounted on said pivotally movable subassembly and being movable about its hinge connection to an open position when said subassembly is moved to a dumping position whereby to permit discharge of grass clippings and the like from said receptacle, said cover member being movable about its hinge connection to a closed position when said subassembly is returned to a filling position.

7. In combination, a riding type mower including a riding vehicle and a lawn mowing unit movable with said vehicle, a grass catcher assembly mounted on said riding vehicle, said grass catcher assembly including a grass-receiving receptacle, a grass delivery tube mounted on said vehicle and having one end thereof positioned to receive grass clippings discharged by said mowing unit and having the opposite end thereof positioned to discharge said grass clippings into said grass catcher assembly, said grass catcher assembly comprising a stationary bearing means adapted to be mounted on the riding mower for supporting for pivotal movement a pivotally movable subassembly, said pivotally movable subassembly including a receptacle support means and a grass-receiving receptacle carried by said receptacle support means, said pivotally movable subassembly further including a journal member supported for pivotal movement by said stationary bearing means whereby to mount said pivotally movable subassembly for pivotal movement, said journal member having an aperture therein through which said grass delivery tube extends into a position in which it can discharge grass clippings or the like into said receptacle, said pivotally movable subassembly being pivotally movable about said bearing means and also being pivotally movable about said grass delivery tube from a filling position to a dumping position in which the grass clippings or the like contained in said receptacle are dumped.

8. The combination defined in claim 7 in which said grass catcher assembly includes means adapted to be stationarily mounted on said riding mower and adapted to engage said pivotally movable subassembly to support said subassembly in the filling position of said subassembly.

9. The combination defined in claim 7 in which said receptacle is a flexible bag.

10. The combination defined in claim 7 comprising a stationary subassembly adapted to be mounted on the riding mower, and in which said stationary subassembly includes said stationary bearing means which supports for pivotal movement said pivotally movable subassembly.

11. The combination defined in claim 7 in which said pivotally movable subassembly includes a bag support frame on which said bag is supported, and in which a pivot ring is carried by and movable with said bag support frame, said pivot ring being journaled in said stationary bearing means, said pivot ring and said stationary bearing means having aligned apertures through which said grass delivery tube extends into a position in which it can discharge grass clippings or the like into said grass collector bag.

12. The combination defined in claim 7 including a cover member for said receptacle, said cover member being hingedly mounted on said pivotally movable subassembly and being movable about its hinge connection to an open position when said subassembly is moved to a dumping position whereby to permit discharge of grass clippings and the like from said receptacle, said cover member being movable about its hinge connection to a closed position when said subassembly is returned to a filling position.

13. The combination defined in claim 7 in which said pivotally movable subassembly is mounted for pivotal movement about an axis extending substantially in the front-to-rear dimension of the riding mower whereby when said pivotally movable subassembly is moved to dumping position the contents of said receptacle are dumped to the side of the riding mower.

14. The combination defined in claim 7 in which said grass catcher assembly is mounted at the rear of the riding vehicle.

* * * * *